(12) United States Patent
Medvinsky

(10) Patent No.: US 7,231,663 B2
(45) Date of Patent: Jun. 12, 2007

(54) SYSTEM AND METHOD FOR PROVIDING KEY MANAGEMENT PROTOCOL WITH CLIENT VERIFICATION OF AUTHORIZATION

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 887 days.

(21) Appl. No.: 10/067,446

(22) Filed: Feb. 4, 2002

(65) Prior Publication Data

US 2003/0149871 A1 Aug. 7, 2003

(51) Int. Cl.
*G06F 7/04* (2006.01)
*H04L 9/00* (2006.01)
*H04L 9/32* (2006.01)
*G06K 9/00* (2006.01)

(52) U.S. Cl. .......................................... 726/10; 713/155
(58) Field of Classification Search ................. 713/155; 726/10
See application file for complete search history.

(56) References Cited

U.S. PATENT DOCUMENTS

| | | | |
|---|---|---|---|
| 5,455,953 A | 10/1995 | Russell | |
| 5,506,961 A | 4/1996 | Carlson et al. | |
| 5,590,199 A | 12/1996 | Krajewski, Jr. et al. | |
| 5,757,920 A | 5/1998 | Misra et al. | |
| 6,993,652 B2 * | 1/2006 | Medvinsky | ................. 713/155 |

FOREIGN PATENT DOCUMENTS

WO   WO00/79432   12/2000

OTHER PUBLICATIONS

Windows 2000 Kerberos Authentication White Paper, Microsoft Corporation, 1999, Section 3 Authorization Data (p. 26-29).*
Neuman, C., et al. The Kerberos Network Authentication Service (v5); Internet Draft; May 24, 2001; Status, Abstract, Overview, Background, Sections 1-1.5 and 5-5.9.1; draft-ietf-cat-kerberos-revisions-07.txt.
The Kerberos Authentication Service (V5) "Network Working Group Request For Comments": 1510; J. Kohl; (Sep. 1993), pp. 1-112.

* cited by examiner

*Primary Examiner*—Gilberto Barrón, Jr.
*Assistant Examiner*—Kristin D. Sandoval
(74) *Attorney, Agent, or Firm*—Larry T. Cullen

(57) ABSTRACT

A method and system for providing a client (102) with a copy of the authorization data that can be accessed and used by the client. The method is well-suited to key management protocols that utilize the concept of tickets. Two copies of the authorization data, a client copy and a server copy, are included within and forwarded to the client where the client is requesting a ticket for a specific application server (106). The client is capable of accessing the client copy of the authorization data such that the client can verify requests, and determine authorization of use for content and/or services requested.

24 Claims, 3 Drawing Sheets

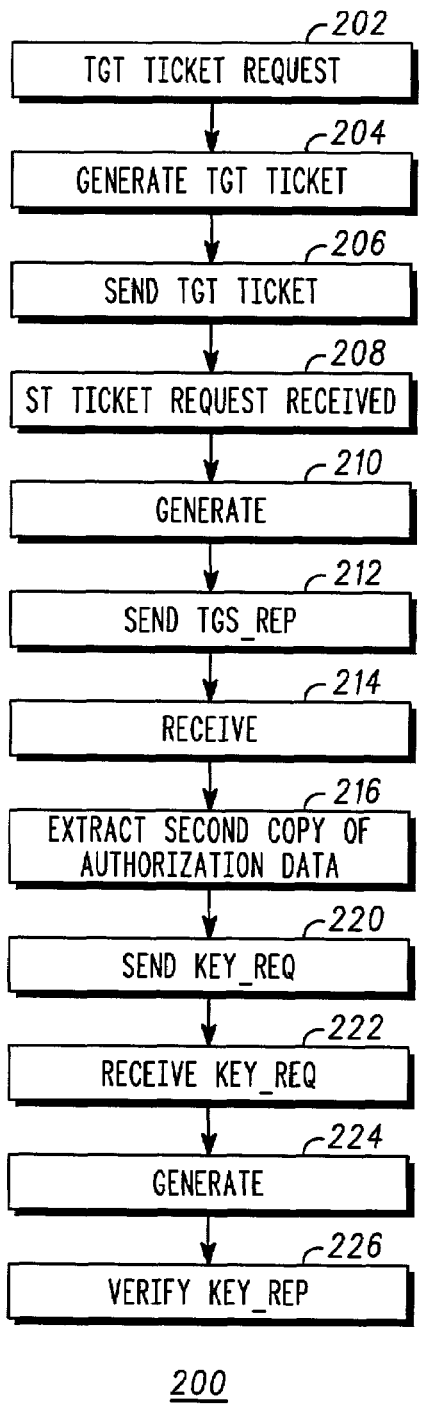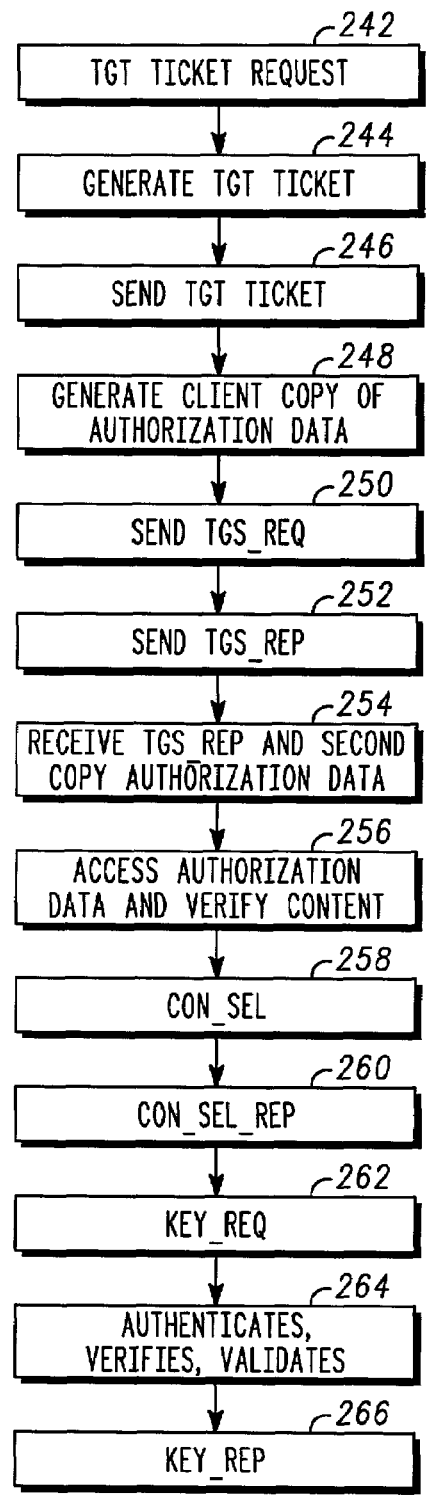
*FIG. 3*
*FIG. 4*

SYSTEM AND METHOD FOR PROVIDING KEY MANAGEMENT PROTOCOL WITH CLIENT VERIFICATION OF AUTHORIZATION

BACKGROUND

1. Field of the Invention

The present invention relates generally to network security, and more specifically to a method and system for providing client privacy when requesting content from an application server.

2. Discussion of the Related Art

The Internet is an insecure network. Many of the protocols used on the Internet do not provide any security. Data that is transmitted over the Internet without using encryption or any other type of security scheme is said to be transmitted "in the clear." Tools are readily available that allow hackers to "sniff" data, such as passwords, credit card numbers, client identity and names, etc., that is transmitted over the Internet in the clear. Thus, applications that send unencrypted data over the Internet are extremely vulnerable.

Kerberos is an example of a known network authentication protocol that is designed to provide authentication for client/server applications by using secret-key cryptography. The Kerberos protocol, which is available from the Massachusetts Institute of Technology, uses cryptography so that a client can purportedly prove its identity to a server (and vice versa) across an insecure network connection. After a client and server have used Kerberos to prove their identity, they can also encrypt all of their communications to purportedly assure privacy and data integrity as they conduct their business.

It is with respect to these and other background information factors relevant to the field of network security that the present invention has evolved.

SUMMARY OF THE INVENTION

The present invention provides a method of providing a client with a copy of authorization data that can be accessed and utilized by the client. The method includes the steps of: receiving an authentication server request (AS_REQ) message from a client; generating an authentication server reply (AS_REP) message; sending the AS_REP to the client; receiving a ticket granting server request (TGS_REQ) message from the client; generating a ticket granting server reply (TGS_REP) message having two copies of authorization data; and sending the TGS_REP with the two copies of the authorization data to the client.

In another embodiment, the present invention provides a method including the steps of: generating a service ticket including a first copy of authorization data; generating a ticket granting server reply including the service ticket; and sending the ticket granting server reply and a second copy of the authorization data to a client. In one embodiment, the step of sending the second copy of the authorization data including encrypting at least the second copy of the authorization data using a client session key such that the client is capable of decrypting and utilizing the second copy of the authorization data, and the step of generating the service ticket includes encrypting at least the first authorization data using a server key.

In another embodiment, the invention can be characterized as a system for providing client privacy when requesting content from an application server. The system includes a key distribution center being configured to generate a ticket granting server reply including at least two copies of authorization data, where the key distribution center is coupled with a client configured to receive the ticket granting server reply and to utilize one copy of the authorization data to verify authorization, and where the client is coupled with an application server configured to supply content to the client, wherein the client being further configured to verify authorized use of the content using the one copy of the authorization data.

In another embodiment, the invention can be characterized as a system for providing a client with access to content and/or services. The system includes a means for generating a service ticket including a first copy of authorization data; a means for generating a ticket granting server reply including the service ticket and a second copy of the authorization data; and a means for sending the ticket granting server reply to a client. The means for generating the ticket granting server reply can include a means for encrypting at least the second copy of the authorization data using a client session key, and the means for encrypting at least the second authorization data can include a means for encrypting at least the second copy of the authorization data such that the client is capable of decrypting and utilizing the second copy of the authorization data. The means for generating the service ticket can include a means for encrypting at least the first copy of the authorization data using a server key. The second copy of the authorization data can be configured to allow the client to verify a request for services from an application server. The second copy of the authorization data can also be configured to allow the client to determine authorized use of received content.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 3 depicts a flow diagram of a method for providing a client with a second copy of authorization data for use by the client;

FIG. 4 depicts a simplified flow diagram of one implementation of a process, similar to the process depicted in FIG. 3.

Corresponding reference characters indicate corresponding components throughout the several views of the drawings.

DETAILED DESCRIPTION

Figure 1:
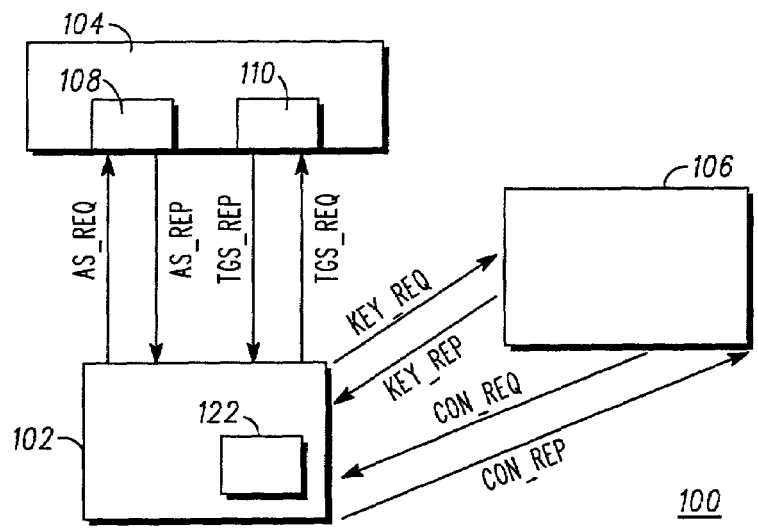
FIG. 1 depicts a simplified block diagram of a system made in accordance with an embodiment of the present invention.

Kerberos suffers from the disadvantage that an entity of the network, such as a client or server, cannot verify the authorization data that is submitted to an application server to access services and/or content supplied by the application server. In part, authorization data defines limits of the services and/or content to be supplied to the client. The authorization data is often specific to the application server 106 and the content and/or services provided by the application server 106. Because the client cannot verify the authorization, the client is unable to check requests for content to ensure there are no options selected which are not authorized. Additionally, because the client cannot verify the authorization data, the client requires additional communication and information to determine if the client is authorized to copy content delivered to the client. This results in errors, excess network traffic and unneeded use of network resources and processing. Still further, because the client is unable to verify the authorization data, the client is unable to determine if the client is authorized, for example, to play back the content more than once without receiving additional communication and information.

The present invention provides a method and system that overcomes these and other disadvantages by delivering a copy of the authorization data to the client that the client can access and utilize to improve network efficiency, reduce network traffic, and streamline content and/or service access and use. By supplying a client with a client copy of the authorization data, the client is able to verify requests by avoiding the inclusion of illegal options in requests for content, and determine clients authorized use of the delivered content and/or services, for example determine whether a copy of delivered content can be saved, and determine if content can be played back more than once.

The present invention is well-suited to key management protocols that utilize the concept of tickets, which are authentication tokens encrypted with a symmetric key that allow a client to authenticate to a specific server. In accordance with an embodiment of the present invention, a key distribution center (KDC) includes two copies of authorization data within a service ticket when the KDC forwards the service ticket to a client, a server or other entity of the network. One of the copies of the authorization, a client copy, is configured such that the client (server or other entity) can access the authorization data for use by the client, and one of the copies of the authorization data, a server copy, is supplied to an application server with a content selection and/or a key request from the client. The present invention overcomes the disadvantages of standard Kerberos and other previous protocols, by supplying a copy of the authorization data which can be accessed and used by a client or server attempting to obtain access to content and/or services provided by an application server.

Referring to FIG. 1, there is illustrated a simplified block diagram of a system 100 for providing secure communication made in accordance with an embodiment of the present invention. The system 100, which comprises an example of one possible implementation of the present invention, uses an authentication key management protocol that provides security and privacy on a network, such as the Internet, an intranet or other network, that can scale to millions of users. In general, the system 100 involves at least one client 102 interacting with one or more centralized key distribution centers (KDC) 104 using both public key and symmetric key algorithms, as well as with individual application servers, such as the application server 106 (and third party server 140, see FIG. 2), using symmetric key algorithms. The protocol is generic and can easily be adapted to different applications that require authentication in a distributed environment. Furthermore, it can be interfaced with a centrally administered user database.

The client 102 can comprise a process, application or device that makes use of a network service on behalf of a user. By way of example, the client 102 may comprise any type of computer, or the client 102 may comprise a "thin client" such as a wireless telephone, pager, personal digital assistant (PDA), home appliance having a low-end microprocessor, or substantially any other device having low or limited processing capabilities. Note that in some cases a server may itself be a client of some other server (e.g., a print server may be a client of a file server).

The application server 106 provides a resource to network clients. In the illustrated embodiment, the KDC 104 includes a first stage 108 and a second stage 110. In one embodiment, the first stage is an authentication server (AS server) 108 and the second stage is a ticket granting server (TGS server) 110. The AS server 108 issues a ticket granting ticket (TGT ticket) to the client 102 after verifying its credentials. The TGS server 110 provides an application server service ticket (ST ticket) to the client 102. The ST ticket is an end service ticket that the client 102 presents to the application server 106 when the client 102 requests a service. The application server 106 provides various services to the client 102, when the client 102 authenticates itself using the ST tickets.

The basic message types used by the system 100 are as follows:

(A) Authentication Server Request message (AS_REQ): Message from the client 102 to request TGT ticket from the AS server 108;

(B) Authentication Server Reply message (AS_REP): Reply message to the client 102 from the AS Server 108 with the TGT ticket;

(C) Ticket Granting Server Request message (TGS_REQ): Message from the client 102 to request an ST ticket from the TGS server 110;

(D) Ticket Granting Server Reply message (TGS_REP): Reply message from the TGS Server 110 to the client 102 with the ST ticket;

(E) Key Request message (KEY_REQ): Message sent from the client 102 to the application server 106 to request security (key management) parameters;

(F) Key Reply message (KEY_REP): Reply message from the application server 106 to the client 102 with sub key and application specific data;

(H) Request for Content and/or Services message (CON_REQ): Message sent from the client 102 to the application server 106 to request desired content and/or services; and (I) Content (CON_REP): Message sent from the application server 106 to the client 102 supplying the desired content and/or services to the client. The content is typically encrypted prior to being sent to the client.

Each of the messages generally include a header followed by the body of the message, with the header being common to the messages. By way of example, the header may include a message type field, a protocol version number field, and checksum. The message type field indicates the message type, such as AS_REQ, AS_REP, etc. Following the message header is the body of the message having the list of attributes preferably in type-length-value (TLV) format.

The client 102 generates an AS_REQ message to initiate the authentication service exchange between the client 102 and the AS server 108 (part of the KDC 104) when the client wishes to obtain a TGT ticket, which is a ticket for the TGS server 110, also part of the KDC 104. In other words, the AS_REQ message is sent by the client 102 to the AS server 108 to obtain the TGT ticket which is used by the client to request ST tickets for specific application servers, such as the application server 106. By way of example, the AS_REQ message may include the client's identity (e.g., name), the TGS server 110's identity, and a nonce to tie it to a response. It may also include a list of symmetric encryption algorithms that are supported by the client 102. To check against replays, this message may also include a timestamp, as well as a signature for message integrity. The signature may be a keyed checksum or a digital signature.

The public key to verify a signature is preferably kept in the user database. Digital certificates can be optionally included in the AS_REQ message and may be utilized instead of the stored public keys to verify digital signatures. The client 102's permanent symmetric key for verifying a keyed checksum is preferably kept in the same user database. The AS_REQ message may also include public key information that is necessary for key agreement (e.g., Elliptic Curve Diffie-Hellman parameters). By way of example, Elliptic Curve may be used for public key encryption because of its processing speed. The use of Elliptic Curve is typically one or two orders of magnitude faster than other encryptions, such as RSA. The Rijndael encryption standard may be used with the 128-bit key length.

The AS server 108 processes the AS_REQ message in order to verify it. If the AS_REQ processing does not generate errors, the AS server 108 generates an AS_REP message in response to the AS_REQ message. Typically, the AS server 108 looks up the TGS server 110's and client 102's keys in the database and generates a random client session key, for subsequent authentication with the KDC 104. The AS server 108 generates a TGT ticket. The TGT ticket typically includes both a clear and an encrypted part. The TGS server 110's identity and the ticket validity period may be provided in the clear inside the issued TGT ticket. The encrypted part of the ticket can include information such as the client 102's name, client session key and any other data to be kept private. The TGT ticket can also provide a list of encryption types and checksum types supported by the KDC 104. The encrypted part of the ticket may be encrypted using the KDC 104's secret key.

In one embodiment, the AS_REP message is signed by the KDC 104 using an algorithm that is identical to the one used by the client 102 to generate a signature for the AS_REQ message. This signature can be either a digital signature or a keyed checksum using the client 102's secret key. The public key information is the KDC 104's public part of the key agreement parameters and should indicate the same key agreement algorithm as the one selected by the client 102. The AS_REP message also preferably contains the nonce that is a copy of the nonce generated by the client in the AS_REQ message, to prevent replays.

In one embodiment, the encrypted part of the AS_REP message provides the client 102 with access to its own authorization data. Supplying the client with a client copy of the authorization data provides a convenience to the client (and user) because if the client 102 knows it own authorization data, it is not going to attempt actions that are later going to simply be rejected by an application server, since an application server trusts only the copy of the client information that is encrypted inside a ticket. Also, for clients with hardware security that prevents a user from hacking and changing its own authorization data, this feature can be a security advantage because readable authorization-data might also authorize the client for some local actions, such as the right to save and replay content (e.g., movies) on local disk. The client copy of the authorization data received in the AS_REP message typically defines general client authorizations and is not specific to servers. The use of the client copy of the authorization-data is further described below.

The encrypted part of the AS_REP message can also contain the client 102's identity to verify that this reply was originally constructed by the KDC 104 for this particular client 102. The data is preferably encrypted with a symmetric key derived from the key agreement algorithm.

The client 102 processes the AS_REP message to verify its authenticity and to decrypt the private ticket part in the message to obtain the TGT ticket. If the authenticity of the AS_REP message cannot be verified, the client 102 preferably does not send an error message back to the AS server 108. In some cases, the client may retry with another AS_REQ message.

The present invention optionally allows the passing of digital certificates in both the AS_REQ and AS_REP messages, to allow the client 102 and the KDC 104 to authenticate each other with digital certificates. Without certificates, it is expected that the client 102 is already provisioned with the KDC public key and that the KDC 104 already has the client 102's public key in its database. A digital signature on an AS_REQ is verified by the KDC 104 with a client public key that it looks up in its database. The client 102 verifies a digital signature on an AS_REP with a pre-provisioned KDC public key.

After the client 102 has obtained a TGT ticket via the AS server 108 exchange, the client 102 initiates the TGS_REQ message exchange between the client 102 and the TGS server 110 of the KDC 104 when the client 102 wishes to obtain authentication credentials for a given or particular application server, such as the application server 106. The TGS_REQ message is generated and sent by the client 102 to the TGS server 110 to obtain an application server service ticket (ST ticket) that is used in a KEY_REQ message (described further below). The client 102 presents the TGT ticket obtained from the AS_REP message as part of the TGS_REQ message. The TGS_REQ message specifies the application server 106's identity as well as the client 102's identity, which is typically inside the TGT ticket, and the client typically includes a nonce. In one embodiment, the client 102's identity is protected because it is in the encrypted part of the TGT ticket and is not included in the clear part of the message. The client session key from the TGT ticket may be used for the encryption and decryption in the TGS_REQ exchange. Thus, a snooper is unable to detect which services the client (e.g., a user) is requesting.

The client 102 preferably saves the nonce value in order to later validate the matching TGS_REP message from the KDC 104. The client 102 preferably keeps the nonce value until a configurable time out value expires. After the time out, the client 102 is no longer able to process the corresponding TGS_REP and has to retry.

The TGS server 110 verifies the TGS_REQ message and processes the TGT ticket. The TGS server 110 then generates the TGS_REP message in response to the TGS_REQ message. The TGS_REP message includes the ST ticket (which is the end service ticket) issued by the KDC 104, which the client 102 presents to the application server 106 when the client attempts to request content and/or services. The application server 106's identity and the ticket validity period may be provided in the clear inside the issued ST ticket. The encrypted part of the ST ticket contains the client 102's name and a server session key encrypted with a server key shared by the application server 106 and the KDC 104. The encrypted part of the ST ticket additionally includes a first copy of authorization data (e.g., a server copy) which in part defines limits of the services and/or content to be supplied to the client. The authorization data is specific to the application server 106 and the content and/or services provided by the application server 106. In one embodiment, the authorization data contains service and/or content specific objects, and the rights to those objects. Any additional client data that needs to be private can also be included as part of the encrypted part of the ST ticket.

In one embodiment, the TGS_REP additionally includes a second copy of the authorization data (e.g., a client copy) which is encrypted using the client session key from the TGT ticket generated by the AS server 108 in the AS_REP message. As described above, the session key is known by the TGS server 110 and the client 102. Because the second copy of the authorization data (the client copy) is encrypted using the session key from the TGT ticket, the client 102 can decrypt the authorization data and utilize the authorization data, such as for verification purposes and other purposes, as described below in detail. The second copy of the authorization data received in the TGS_REP message can provide more specific authorization, including more server specific authorization, than a second copy of the authorization data received in the AS_REP message. Authorization data received in the AS_REP message is more general and defines non-server specific client authorizations, for example, whether the client is authorized to store content.

The TGS_REP message is signed by the KDC 104 with a keyed checksum using the TGT ticket session key. The TGS_REP message additionally contains the nonce that was copied from the TGS_REQ message, to prevent replays.

By way of example, the TGS server 110 may generate the TGS_REP message using the following procedure. First, the nonce from the TGS_REQ message is included in the TGS_REP message to tie it to the request. Next, the KDC 104 assigns the type of the random ST ticket session key. If more than one encryption algorithm is available, the KDC 104 preferably selects the strongest one. The KDC 104 then generates the ST ticket including the first copy, the server copy, of the authorization data. The application server 106's secret key is used to encrypt the encrypted part of the ST ticket and also generate a keyed checksum over the whole ST ticket. The end time of the ST ticket is preferably determined by the KDC 104. The client 102 may specify a shorter lifetime, if it wishes. The encrypted part of the ST ticket contains the client 102's identity, the first copy of the authorization data, session key and other private data. The TGS_REP message further includes an encrypted data portion, where the TGT ticket session key is used to generate the encrypted data portion. The encrypted data portion includes the second copy of the authorization data, and a keyed checksum, generated using the TGT session key, can be added over the TGS_REP message. Again, this is just one example of a procedure that the TGS server 110 may use to generate the TGS_REP message which includes two copies of the authorization data.

Because the TGS_REP message includes two copies of the authorization data, one contained in the encrypted part of the ST ticket and one encrypted with the session key from the TGT ticket, the application server 106 as well as the client 102 have access to and can use the authorization data. This way the client is capable of performing checks and verifications without the need for additional communications and additional data. The present invention differs from Kerberos, where in Kerberos a KDC reply to a ticket request from a client for a particular application server only includes a single copy of the authorization data which is only accessible to the application server upon decryption of the ST ticket. The client has no access to the authorization data and cannot utilize the data. Alternatively, the KDC in the present invention generates a reply to a ticket request from a client for a particular application server by including two copies of the authorization data, one encrypted within the ST ticket and one encrypted using the client TGT ticket session key allowing the client 102 to decrypt the second copy of the authorization data and utilize the authorization data.

In one embodiment, the client 102 includes an authorization module 122. The authorization module receives the second copy of the authorization data and is configured to analyze the authorization data to determine what and how the client is authorized to utilize the content and/or services provided by the application server 106. The authorization module 122 can be implemented through hardware, software or a combination of hardware and software. In one embodiment, the authorization module 122 is a hardware module that decodes the authorization extracted from the authorization data, verifies client 102 authorization for content and/or services and proceeds to decrypt requested content and/or to provide services only if the client does not exceed the authorization. In order to resist software hacking attacks outside of the hardware module, the secret key used to verify a keyed checksum for the authorization data is not exposed in the client outside of the hardware module. To achieve that, in one embodiment, the whole key management protocol is implemented inside the same hardware module 122 and the secret or private keys are not exposed in the clear within the client outside of the hardware module.

By way of example, the client 102 may use the following procedure to process the TGS_REP message. In this example, "client" refers to either the client 102 itself or the authorization module 122(when it is present inside the client). One skilled in the art would recognize that a client with an authorization module 122 typically does not allow cryptographic processing to occur outside of the authorization module. First, the client 102 parses the TGS_REP message header. If the header parsing fails, then the client 102 acts as if the TGS_REP was never received. The client 102 preferably does not send an error message back to the TGS server 110. In some cases, the client 102 retries with another TGS_REQ message. If there are outstanding TGS_REQ messages, the client 102 may continue waiting for a reply until a time out and then retry. Next, the client 102 verifies the protocol version number in the header. If this protocol version is not supported, the client 102 acts as if the TGS_REP message was never received. Otherwise, the client 102 then parses the rest of the message. If the message format is found to be illegal, the client 102 acts as if the TGS_REP message was never received.

Next, the client 102 looks for an outstanding TGS_REQ message with the same nonce. If there is no match, the client proceeds as if the message was never received. If there is a match, then the client 102 verifies the checksum using the TGT ticket session key. If the checksum does not verify, this message is dropped and the client 102 proceeds as if the message was never received.

The client then decrypts the private ticket part in the TGS_REP message, using the TGT ticket session key. If the private ticket part cannot be decrypted because the TGT ticket session key type and the type of the encrypted data do not match, a fatal error is reported to the user and the client 102 does not retry. If the resulting clear text contains formatting errors, contains a session key with the type that is not supported by this client 102, or contains a client identity that does not match the request, a fatal error is also reported to the user and the client 102 does not retry. If the session key type is supported and the client is capable of decrypting the private ticket part of the TGS_REP message, the client extracts the second copy of the authorization data, verifies it and retains it for later use.

The client 102 then processes the ST ticket. If there is an error in the ST ticket, it is reported to the user as a fatal error and the client 102 does not retry with another TGS_REQ message. If no errors in the TGS_REP message are detected, the client 102 saves the full ST ticket and the clear text private ticket part, including the second copy of the authorization data, in a new entry in its ticket cache. In an embodiment where an authorization module 122 is present inside the client 102, the ST ticket can be stored outside of the authorization module 122 inside the client 102 because the client does not possess the server key to generate a checksum for a modified version of the ticket. The authorization data can be stored inside the authorization module 122 or authenticated with a keyed checksum or a digital signature and then stored outside of the module inside the client 102. If the authorization data is stored outside of the authorization module 122 (to minimize the module's storage requirements), attempts by a hacker to change the authorization data will be detected by the authorization module 122. That is because the key used to generate the keyed checksum or digital signature for the authorization data is not readable outside of the authorization module 122.

The KEY_REQ and KEY_REP messages are used for key management and authentication between the client 102 and the application server 106. The KEY_REQ message is sent by the client 102 to the application server 106 in order to establish a new set of security parameters. The KEY_REQ message can also be used by the client 102 to periodically establish new keys with the application server 106. The client 102 starts out with a valid ST ticket, previously obtained in a TGS_REP message. The application server 106 starts out with its service key that it can use to decrypt and validate tickets. The client generates the KEY_REQ message that includes the ST ticket and keyed checksum needed to authenticate the client 102. The KEY_REQ message preferably also contains a nonce to tie it to the response KEY_REP message and the client timestamp to prevent replay attacks.

When the client 102 generates the KEY_REQ message, the first copy of the authorization data and, in one embodiment, the client 102's identity are in the encrypted part of the ST ticket. After the client 102 sends out the KEY_REQ message, it saves the client nonce value in order to later validate a matching KEY_REP message from the application server 106. The client 102 keeps the client nonce value until a configurable time out value expires. After the time out, the client 102 is no longer able to process the corresponding KEY_REP message. The client 102 may retry after this time out.

The KEY_REP message is sent by the application server 106 in response to the KEY_REQ message. By way of example, the KEY_REP message may include one or more randomly generated subkeys, encrypted with the session key shared between the client 102 and the application server 106. The KEY_REP message may also include additional information that is needed to establish security parameters.

The client 102 receives the KEY_REP message and processes the KEY_REP message. The client parses the message header, verifies the protocol version number, parses the rest of the message, matches the nonce in the KEY_REP with an existing client KEY_REQ nonce and verifies the checksum using the session key shared between the client 102 and application server 106. The client further decrypts the subkey of the KEY_REP using the shared session key, verifies that a selected ciphersuite is acceptable, parses the EncryptedDOI object (authorization), generates content decryption and authentication keys from the subkey and saves them for later use.

In one embodiment, the CON_REQ message is sent by the client 102 to the application server 106 once the client receives and verifies the KEY_REP. In generating the CON_REQ message the client accesses the decrypted second copy of the authorization data, which the client received and decrypted from the AS_REP message and/or the TGS_REP message with the ST ticket, and confirms the authorization data to ensure that the CON_REQ message does not contain illegal or unauthorized options. Therefore, the client's user interface is improved and the user can be prevented from selecting unauthorized options from the very beginning, without having to submit a CON_REQ message to the server and wait for a response. In one embodiment, if the client 102 somehow still generated an unauthorized CON_REQ message, the authorization module 122 holds a symmetric key needed to generate a keyed checksum for the CON_REQ message and refuses to generated this keyed checksum for a CON_REQ message that violates or exceeds the client's authorization as defined by the second copy of the authorization data. Therefore, an application server 106 typically does not see unauthorized CON_REQ messages as they are rejected on the client side, but when such an unauthorized message does come through, the CON_REQ does not have the correct keyed checksum and is rejected without requiring the server 106 to check client authorization.

The confirmation of the authorization data further optimizes the system by avoiding processing of unauthorized messages at the application server 106 and improves client interaction with the user, allowing the user to locally evaluate authorization without waiting for an application server 106 response. In one embodiment, the CON_REQ messages is encrypted using the session key shared between the client 102 and application server 106.

Upon receipt of the CON_REQ message the application server 106 processes the CON_REQ message and validates the request with the first copy of the authorization data received as part of the encrypted ST ticket. If there are no errors and the request for content does not violate the authorization of the authorization data, the application server 106 generates the CON_REP message and initiates the delivery of the content and/or services requested by the client. Typically, the content delivered is encrypted by the application server 106 using the session key shared between the client 102 and the server 106.

The client 102 receives the content, decrypts the content and begins to process and utilize the content. In one embodiment, because the client 102 has a copy of the authorization data, the client can determine authorized use of received content and/or services. For example, the client 102 can determine, by checking the authorization data, whether or not the client is authorized to store or save a copy of the content. The authorization module 122 checks the authorization data and determines the client's authorization. If the client is authorized, the client can save the content as it is received and decrypted. Additionally, because the client has a copy of the authorization data, the client 102, in one embodiment through the authorization module 122, can further determine by checking the authorization whether or not the client can play back or reuse the content more than one time. The authorization module 122 typically contains stored content decryption keys and refuses to decrypt content without proper authorization. The ability to determine the client's authorization is achieved by utilizing the second copy of the authorization data the client 102 received in the TGS_REP message and stored for local use. This improves client operation and limits communication across the network.

In one embodiment, the system 100 does not require the TGS_REQ and TGS_REP exchange to occur in order for the client to obtain an ST ticket and a client copy of the authorization data. The client 102 submits an AS_REQ for a service ticket to a specific server, for example application server 106. The KDC 104 processes the AS_REQ and returns an ST ticket for the first application server, which includes the first copy of the authorization data. The KDC further sends the second copy of the authorization data to the client formatted to be accessed and utilized by the client 102. Typically, the KDC 104 returns an AS_REP that includes the ST ticket with the first copy of the authorization data, and the client copy of the authorization data. Thus, the client still obtains the client copy of the authorization data along with the ST ticket without submitting the TGS_REQ.

Figure 2:
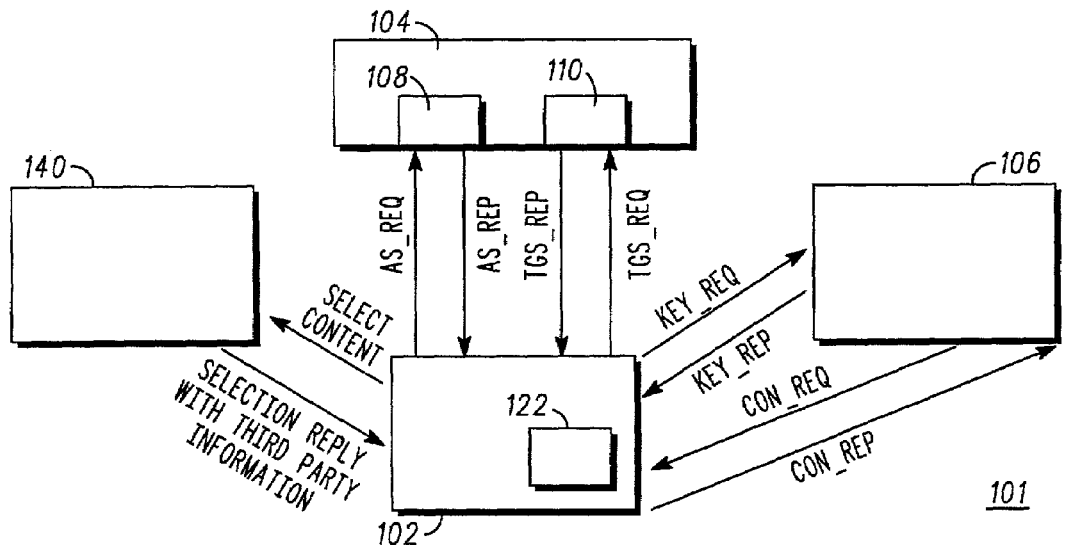
FIG. 2 depicts a simplified block diagram of a system according to one implementation of one embodiment of the present invention.

FIG. 2 depicts a simplified block diagram of a system 101 according to one implementation of one embodiment of the present invention. In one embodiment, the client 102 accesses a third party server 140 to select desired content and/or services, and then accesses the application server 106 to actually receive the selected content and/or services. In selecting the content and/or services, the client 102 utilizes the client copy of the authorization data. Prior to submitting a selection for content and/or services to the third party server 140, the client determines the content and or services desired, and then checks the client copy of the authorization data to avoid making a selection that exceeds the client's authorization. The client 102 then sends the content and/or services selection to the third party server 140. The third party server 140 then verifies the content and/or services selection and sends a content and/or services selection reply message to the client 102 including information that is used by the application server 106 to authorize the client and allow the client to gain access to the selected content and/or services. Thus, the client 102 references the authorization data and avoids requesting authorization for content and/or services from the third party server 140 that will just be later rejected by the application server 106 when the application server attempts to determine the client's authorization based on the third party server information.

In one embodiment, the third party application server 140 additionally includes an authentication of the third party information. This authentication is additionally forwarded by the client 102 to the application server 106, typically in the KEY_REQ message. The application server 106 utilizes this authentication to authenticate the third party server information supplied to the application server by the client 102 to ensure that the information used to authorize the client was actually supplied to the client from the third party server 140 and not some other network entity, or not some counterfeit information generated by the client.

In submitting the KEY_REQ message to the application server 106, the client 102 includes the third party server information, and the authentication if it was supplied to the client. The application server 106 processes the KEY_REQ message, authenticates the third party server information, and utilizes the information to verify the client authorization. Once authenticated and verified, the application server 106 generates the KEY_REP, as described above.

Referring to FIG. 3, there is illustrated a flow diagram of a method 200 for providing a client with a second copy of authorization data for use by the client when requesting and using content and/or services from an application server. By way of example, the method 200 may be implemented by the system 100 and the appropriate message types described above. In step 202 a request for a TGT ticket is received from a client, such as the client 102. In step 204 the TGT ticket is generated. Step 204 may be performed, for example, by the AS server 108. In step 206 the TGT ticket is sent to the client. This step may also be performed by the AS server 108. In one embodiment, the client extracts the client copy of the authorization data, if the client copy of the authorization data is included within the AS_REP. In step 208 a request for an ST ticket for a particular application server is received from the client. The request for the ST ticket includes the TGT ticket and typically does not provide the identity of the client in the clear. In step 210 a TGS_REP message is generated including the ST ticket with a first copy of the authorization data encrypted within the ST ticket, and a second copy of the authorization data encrypted using the session key from the TGT ticket. In one embodiment, the generation of the TGS_REP is performed by the TGS server 110. In step 212 a TGS_REP message is sent to the client with both copies of the authorization data, which may also be performed by the TGS server 110. In step 214, the client receives the TGS_REP. In step 216, the client extracts at least the second copy of the authorization data from the TGS_REP. In step 220, the client generates and sends a KEY_REQ message including the ST ticket which further includes the first copy of the authorization data. In step 222, the application server receives and processes the KEY_REQ. The application server extracts the ST ticket, decrypts the ST ticket and validates the first copy of the authorization data. In step 224, the application server generates a KEY_REP message and sends the KEY_REP message to the client. In step 226 the client verifies the KEY_REP message and matches it with a KEY_REQ message.

FIG. 4 depicts a simplified flow diagram of one implementation of a process 240, similar to the process 200 depicted in FIG. 3. In step 242, the client sends the TGT ticket request. In step 244, the KDC 104 generates the TGT ticket. In step 446, the KDC 104 sends the TGT ticket with a client copy of the client authorization data. In step 248, the client receives the TGT ticket and extracts a general client copy of the authorization data. In step 250, the client 102 sends the TGS_REQ requesting the ST ticket. In step 252, the KDC returns the TGS_REP. In step 254, the client receives the TGS_REP and extracts the ST ticket and the server specific second copy of the authorization data. In step 256, the client determines content and/or services are desired, then accesses the client copy of the authorization data and verifies the desired content and/or services to avoid requesting content and/or services exceeding authorization. In step 256, the client 102 submits a content and/or services selection to the third party server 140. In step 260, the third party server sends the content and/or services selection reply including the third party information used for authorizing the client, and an authentication of this information (e.g., a keyed checksum). The third party information includes information that can be used to verify the authorization of the client, for example: the identification of the content selected by the client; various purchase options associated with the content, such as "charge to a credit card", "allow the client to save this content;" and other such information. The third party information can also include restrictions associated with the content, such as a list of blackout regions (e.g., blackout regions based on countries, states or zip codes) and other such restrictions. In step 262, the client 102 sends a KEY_REQ message to the application server 106 that does not exceed the authorization data. The KEY_REQ message includes the third party information along with its authentication and the ST ticket, which further includes the first copy of the authorization data. In step 264, the application server 106 authenticates the information, verifies the client authorization for content and/or services using the third party information and the first copy of the authorization data. In step 266, the application server 106 sends the KEY_REP to the client 102.

Figure 5:
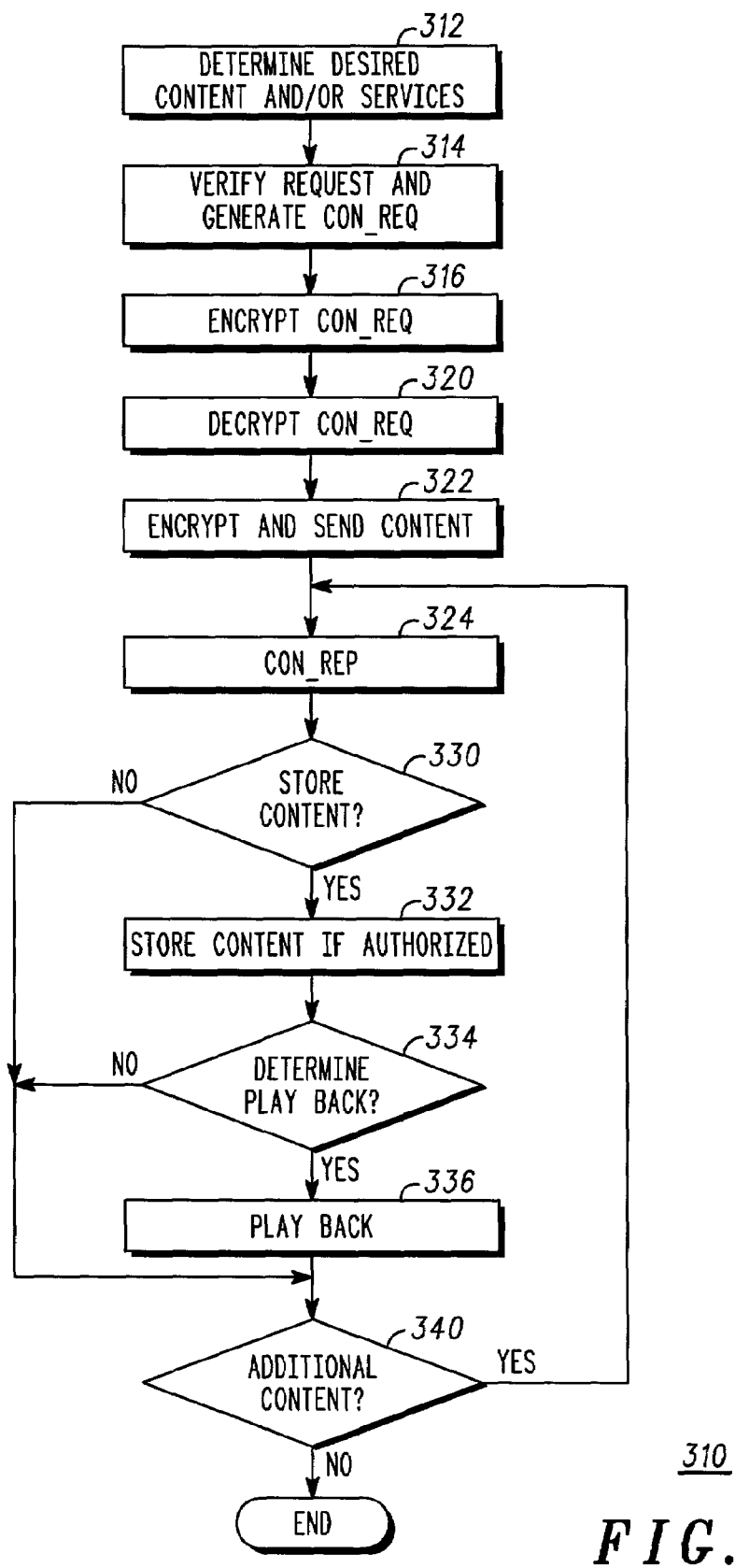
FIG. 5 depicts a simplified flow diagram of one implementation of a process for a client requesting and receiving content and/or services from an application server.

FIG. 5 depicts a simplified flow diagram of one implementation of a process 310 for a client requesting and receiving content and/or services from an application server. In one embodiment, the process 310 follows step 226 of the process 200, as shown in FIG. 3, for supplying a client with a second copy of the authorization data. In step 312 the client, such as client 102, determines what content and/or services are desired. For example, the client receives a request for content from a user or other network entity. In step 314, the client verifies the request for content and/or services to ensure that the request is authorized and does not exceed authorized use, by checking and comparing the request for content with the second copy of the authorization data previously obtained and stored. Once the client verifies the request, the client generates the CON_REQ message. In step 316, the client encrypts, authenticates with a keyed checksum and sends the CON_REQ message to an application server, such as application server 106 (or third party server 140). In step 320, the application server decrypts the CON_REQ message and validates the request based on the keyed checksum as well as the client's authorized access as defined in the first copy of the authorization data found within the ST ticket. In step 322, the application server encrypts and sends the requested content and/or service if the ST ticket and authorization data are verified. In one embodiment, the application server sends the requested content in a plurality of different packets such that the entire desired content is not included in a single packet but in several packets. In step 324, the client receives the requested content and processes the data. In step 330, the client accesses the second copy of the authorization data it has stored and determines if the client can store a copy of the content and/or services. In step 332, the client stores the content and/or services if the client is authorized to do so. If not, the client is allowed to access the contents when it is received the first time, and the process proceeds to step 340 to look for additional content. Otherwise, step 334 is entered where the client determines if it can play back the content more than once. If yes, step 336 is entered where the client can access and play back the content one or more times. In step 340, the process determines if there is additional content and/or services to be received. If yes, the process 310 returns to step 324 to receive additional content and/or services. If in step 336, it is determined there is no further data and/or content the process 310 terminates.

The present invention provides a method, system, apparatus, program, and computer program product allowing a client to store and access its own copy of the authorization data. This provides for improved user interface, reduced errors, improved efficiency and optimization of content and/or service delivery. Further, allowing the client to access its own copy of the authorization data allows the client to make determinations about the processing and utilization of the delivered content and/or services. Still further, it reduces the amount communication necessary and reduces overall network traffic. In one embodiment, the present invention is implemented in an electronic security broker (ESBroker) protocol developed by Motorola, Inc., and as part of an IP rights management system also developed by Motorola, Inc.

While the invention herein disclosed has been described by means of specific embodiments and applications thereof, numerous modifications and variations could be made thereto by those skilled in the art without departing from the scope of the invention set forth in the claims.

What is claimed is:

1. A method of verifying client authorization when requesting content and/or services from an application server, comprising the steps of:
    receiving a service ticket request from a client, the service ticket request including a ticket granting ticket previously provided to the client;
    generating a service ticket including a first copy of authorization data;
    sending a second copy of the authorization data to a client, whereby the second copy of the authorization data is not contained in a ticket and is encrypted when sent to the client; and
    sending the service ticket to the client, the service ticket containing the first copy of the authorization data.

2. The method as claimed in claim 1, further comprising the step of:
    generating an AS_REP, including the service ticket and the second copy of the authorization data; and
    sending the AS_REP to the client.

3. The method as claimed in claim 1, further comprising the steps of:
    generating a ticket granting server reply (TGS_REP) including the service ticket; and
    sending the ticket granting server reply to the client.

4. The method as claimed in claim 3, further comprising the steps of:
    receiving an authentication sewer request (AS_REQ) message from a client;
    generating an authentication server reply (AS_REP) message;
    sending the AS_REP to the client;
    receiving a ticket granting sewer request (TGS_REQ) message from the client; and
    the step of generating the TGS_REP including generating the TGS_REP having two or more copies of authorization data including the second copy of the authorization data.

5. The method as claimed in claim 3, further comprising the steps of: generating an authentication sewer reply (AS_REP) message including the second copy of the authorization data; and sending the AS_REP to the client including the step of sending the second copy of the authorization data to the client.

6. The method as claimed in claim 3, further comprising the steps of: configuring the second copy of the authorization data such that the second copy of the authorization data is used by the client.

7. The method as claimed in claim 6, further comprising the step of: encrypting the second copy of the authorization data using a client session key.

8. The method as claimed in claim 7, further comprising the step of: encrypting the sewice ticket using the sewer service key.

9. The method as claimed in claim 7, wherein the step of encrypting using the client session key including using the session key from a ticket granting ticket in an AS_REP.

10. The method as claimed in claim 6, further comprising the steps of:

the client determining desired content;

the client verifying the desired content with the second copy of the authorization data; the client generating a request for content;

the client sending the request for content to a third party server; and the third party sewer sending third party information to the client later used by the application server in determining client authorization for the requested content.

11. The method as claimed in claim 6, further comprising the steps of:

receiving a key request (KEY_REQ) from the client; generating a key reply (KEY_REP);

forwarding the KEY_REP to the client; the client generating a request for content;

the client verifying the request for content with the second copy of the authorization data; and the client sending the request for content to an application server if the client verifies there are no errors in the request for content.

12. The method as claimed in claim 6, further comprising the steps of:

receiving a request for content;

sending at least a portion of the requested content to the client; and the step of configuring the second copy of the authorization data including configuring the second copy of the authorization data such that the client is capable of using the second copy of the authorization to determine at least an authorized use of the requested content.

13. The method as claimed in claim 12, further comprising the steps of: the step of configuring the second copy of the authorization data such that the client is capable of using the second copy of the authorization to determine if the client is authorized to store the requested content.

14. The method as claimed in claim 13, further comprising the steps of: the step of configuring the second copy of the authorization data such that the client is capable of using the second copy of the authorization to determine if the client is authorized to play back the requested content.

15. A system for providing secure communication across the system, comprising:

a key distribution center (KDC) first stage being configured to issue a ticket granting ticket (TGT) to a client; and a KDC second stage being configured to generate a ticket granting server reply including at least two copies of authorization data in response to a TGT received from the client, whereby at least one copy of the authorization data is not contained in a ticket and is encrypted when sent to the client.

16. The system as claimed in claim 15, further comprising: the client being configured to receive the ticket granting sewer reply and to utilize one copy of the authorization data to verify authorization.

17. The system as claimed in claim 15, further comprising: the client being coupled with an application server, wherein the application sewer being configured to supply content to the client; and the client being further configured to use the one copy of the authorization data to verify authorized use of the content.

18. A system for providing a client with access to content and/or services, comprising the steps of:

a means for generating a service ticket including a first copy of authorization data;

a means for generating a ticket granting server reply including the service ticket and a second copy of the authorization data, whereby the second copy of the authorization data is not contained in a ticket and is encrypted when sent to the client; and a means for sending the ticket granting server reply to a client.

19. The system as claimed in claim 18, wherein the means for generating the ticket granting server reply includes a means for encrypting at least the second copy of the authorization data using a client session key.

20. The system as claimed in claim 19, wherein the means for encrypting at least the second authorization data includes a means for encrypting at least the second copy of the authorization data such that the client is capable of decrypting and utilizing the second copy of the authorization data.

21. The system as claimed in claim 20, wherein the means for generating the service ticket includes a means for encrypting at least the first copy of the authorization data using a server key.

22. The system as claimed in claim 18, wherein the second copy of the authorization data being configured to allow the client to verify a request for services from an application server.

23. The system as claimed in claim 18, wherein the second copy of the authorization data being configured to allow the client to determine authorized use of received content.

24. A system for providing secure communication across the system, comprising:

a key distribution center (KDC) first stage being configured to issue a ticket granting ticket (TGT) and at least a client copy of authorization data to a client, wherein the client copy of the authorization data is configured such that the client is capable of determining client authorization and the client copy of the authorization data is not contained in a ticket and is encrypted when sent to the client; and a KDC second stage being configured to generate a ticket granting server reply.

* * * * *